D. H. MOSTELLER.

ICE CREAM SPOON.

APPLICATION FILED APR. 12, 1910.

Reissued Nov. 22, 1910.

13,170.

Witnesses:

Ephraim Banning

Mary R. Frost.

Inventor:

Dosier H. Mosteller.

BY Banning & Banning

Attorneys.

THE NORRIS PETERS CO., WASHINGTON, D. C.

UNITED STATES PATENT OFFICE.

DOSIER H. MOSTELLER, OF CHICAGO, ILLINOIS, ASSIGNOR TO THE MOSTELLER MANUFACTURING COMPANY, OF CHICAGO, ILLINOIS, A CORPORATION OF ILLINOIS.

ICE-CREAM SPOON.

13,170. Specification of Reissued Letters Patent. Reissued Nov. 22, 1910.

Original No. 951,571, dated March 8, 1910, Serial No. 489,664. Application for reissue filed April 12, 1910. Serial No. 555,111.

*To all whom it may concern:*

Be it known that I, DOSIER H. MOSTELLER, a citizen of the United States, residing at Chicago, in the county of Cook and State of Illinois, have invented certain new and useful Improvements in Ice-Cream Spoons, of which the following is a specification.

The present invention relates to an improved ice-cream spoon; and has for its essential object, to provide a comparatively simple construction, which is attractive and handsome in appearance, and in which all of the mechanisms for operating the scraper blades will be housed within a chamber formed in an elongated shank which extends outwardly from the cup of the spoon and serves as a handle for the spoon.

The invention further consists in the features of construction and combination of parts hereinafter described and claimed.

Figure 1:
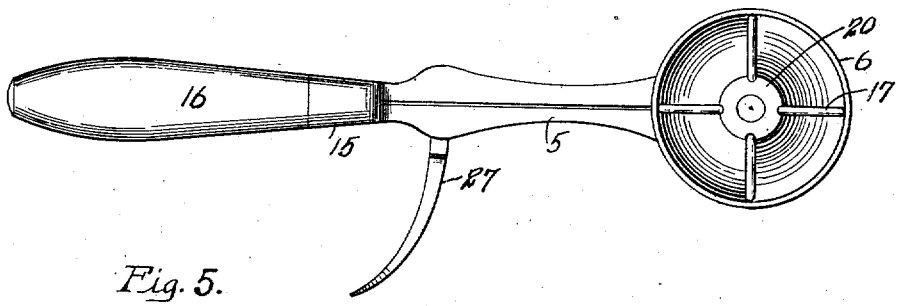
Figure 5:
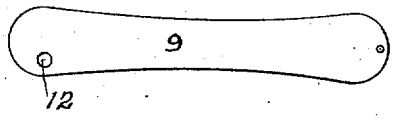
Figure 2:
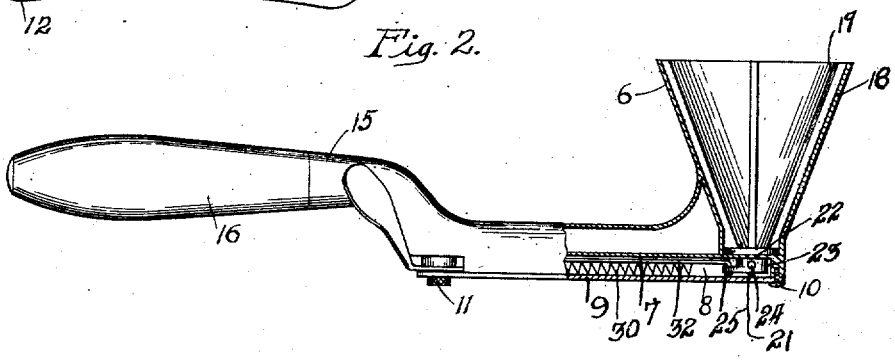
Figure 3:
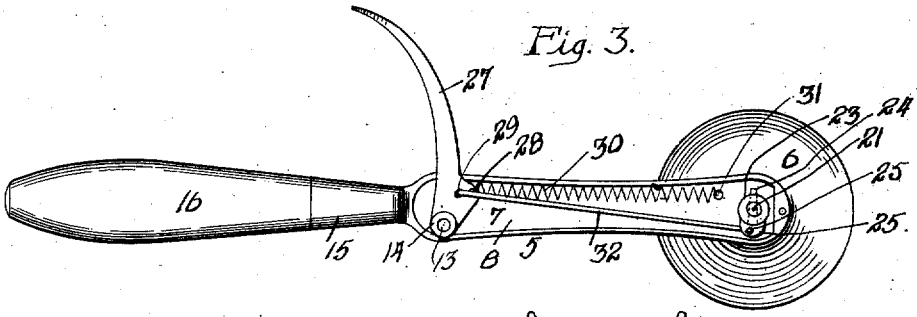
Figure 4:
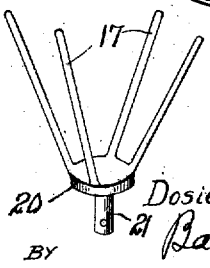

In the drawings, Figure 1 is a plan view; Fig. 2, a sectional elevation showing a portion of the cup and handle in section; Fig. 3, a bottom view showing the bottom plate of the shank or stem removed; Fig. 4, a detail in perspective of the scraper blades; and Fig. 5, a plan view of the bottom plate of the shank or stem.

This improved ice-cream spoon has an elongated shank or stem 5 outwardly extending from the body or cup 6 of the spoon, and is preferably formed of aluminum, or other suitable material which is light and durable. The shank or stem is hollow and is provided midway its upper and lower edges with a cross wall 7, forming a chamber 8 between said cross wall and the lower edge of the shank, in which is positioned mechanism for operating the scraper blades. The chamber is closed by means of a plate 9, which is secured, at one end, by a screw or other fastening means 10, and at its other end between an adjustable nut 11 and the trigger of the scraper actuating mechanism; and the plate is provided with a hole 12, which surrounds a stem 13 formed on a boss 14. The shank or stem is bent upward to provide an outwardly extending portion 15, which secures a grip 16.

Referring to Fig. 4, the movable scraper blades 17 comprise a plurality of outwardly diverging prongs having flat underfaces 18 and rounded outer faces 19; and the prongs merge together at their lower ends into an annular plate 20, having a downwardly projecting stem 21. When the stem 21 is inserted into a central opening 22, formed centrally with respect to the base of the cup 6, a retaining collar 23 is inserted over its lower end, said collar having a corresponding opening drilled therethrough, so that when the openings in the stem 21 and the collar 23 are brought into register, a locking pin 24 will retain the parts in proper operative position. Upon the periphery of this collar 23 is formed a lug 25, having a hole 26 drilled therethrough.

A trigger 27 has its inner end pivotally mounted upon the post or stud 13, and has, as shown, two holes 28 and 29 respectively formed in its body. The hole 28 is adapted to receive one end of a coil spring 30, the other end of which is fastened about a pin or screw 31 secured to the bottom of the spoon, the tension of the spring normally keeping the trigger in advance forward position. A connecting bar or link 32 has its hooked end in engagement both with the hole 29 in the trigger 27 and with the opening 26 in the lug 25, so that when the trigger is pulled backward, the scraper plates within the cup 7 will be revolved within the cup.

From the foregoing description, it will be seen that the various parts comprising this mechanism are extremely simple in construction and easy to replace when worn out or broken, and that the elongated cover 7 serves to effectually house and conceal the mechanism within the spoon body, so that it will not come in contact with the material dished out, which would impair the operation of the device and render it insanitary.

I claim:

1. In an ice-cream spoon, the combination of a cup-shaped receptacle, scraping mechanism within the receptacle, a hollow elongated shank outwardly extending for the major portion of its length from the lower end of the receptacle and having its bottom cut away, a cross wall extending through the shank longitudinally thereof and at a point midway vertically thereof, and forming the bottom of the receptacle, a stem attached to the scraper mechanism and projecting below the cross wall, a lug on the stem, a finger piece, a connection between the finger piece and the stem, said finger piece and connection lying below the cross wall, a pivot stem upon which the finger piece is mounted, a cover forming a closure for the bottom, and said pivot stem serving as a mounting for the cover, substantially as described.

2. In an ice-cream spoon, the combination of a cup-shaped receptacle, scraping mechanism within the receptacle, a hollow elongated shank outwardly extending for the major portion of its length from the lower end of the receptacle, and having its bottom cut away, a cross wall extending through the shank longitudinally thereof and at a point midway vertically thereof, and forming the bottom of the receptacle, a finger piece, a connection between the finger piece and scraper mechanism, said finger piece and connection lying below the cross wall, a pivot stem upon which the finger piece is mounted, a cover forming a closure for the open bottom of the shank, and said pivot stem serving as a mounting for the cover, substantially as described.

3. In an ice-cream spoon, a recessed shank forming a handle for the spoon and merging at its forward end into a cup, a movable scraper within the cup, comprising outwardly diverging prongs united at their ends in a plate having a downwardly projecting stem inserted through the opening in the bottom of the cup, a collar locked to the end of the stem and having a lug formed thereon, a trigger pivotally mounted to a stem at the outer end of the recessed shank, a spring having one of its ends connected to the trigger and its other end secured within the recessed shank, a link connected to the trigger and the lug of the collar, whereby when the trigger is moved the scrapers will be actuated within the cup, and a cover for protecting the mechanism within the shank, the outer edge of the cover being maintained in place by a fastening member at its front end entered into the bottom edge of the cup, and at its inner end by engagement with the pivot stem, to which it is locked by an adjustable nut, substantially as described.

DOSIER H. MOSTELLER.

Witnesses:
WM. P. BOND,
WALKER BANNING.